United States Patent [19]

Stiglich

[11] Patent Number: 4,569,277
[45] Date of Patent: Feb. 11, 1986

[54] COOKING APPARATUS FOR PASTA AND THE LIKE

[76] Inventor: Nicholas M. Stiglich, 215 8th St., Cresskill, N.J. 07626

[21] Appl. No.: 698,233

[22] Filed: Feb. 5, 1985

[51] Int. Cl.4 .................. A47J 27/10; A47J 27/12
[52] U.S. Cl. .................................. 99/330; 99/331; 99/342; 99/348; 99/408; 99/448; 239/204; 294/902; 426/509
[58] Field of Search .............. 99/342, 408, 330, 331, 99/355, 348, 448; 426/509, 510; 126/373, 374; 239/204, 205, 206; 294/902

[56] References Cited

U.S. PATENT DOCUMENTS

| | | | |
|---|---|---|---|
| 2,650,536 | 9/1953 | Russell | 99/448 X |
| 2,978,975 | 4/1961 | Rossi | 99/330 |
| 3,827,344 | 8/1974 | Pratolongo | 99/355 X |
| 3,928,045 | 12/1975 | Tsunoda | 99/330 |
| 3,958,503 | 5/1976 | Moore | 99/448 X |
| 4,214,514 | 7/1980 | Contino | 99/330 |
| 4,272,023 | 6/1981 | Georgiev | 239/204 |
| 4,437,395 | 3/1984 | Speaker | 99/448 X |

Primary Examiner—Billy J. Wilhite
Attorney, Agent, or Firm—W. Patrick Quast

[57] ABSTRACT

Cooking apparatus having a plurality of individual portion sized pots disposed in a pot chamber is provided for cooking pasta and other foods "to order". Each pot has a cooking fluid admitting opening in the bottom thereof which receives a cooking fluid nozzle therein. The pot opening is covered by a mesh or other apertured cap which admits cooking fluid but prevents the pasta from escaping. The head of the nozzle has a "hat-shaped" cap slidably mounted thereon which closes the pot opening and injects heated cooking fluid into the pot when the nozzle is connected to a source of heated cooking fluid and which opens the pot opening and drains the pot when the nozzle is disconnected from the cooking fluid source. Cooking and draining are accomplished without moving the nozzle or the pot. The drained cooking fluid is collected in the pot chamber and recirculated by means of a filter and pump so that it may be used again for the same or other pots. The apparatus also has pot spinning equipment for centrifugal drying of the pasta after cooking and an oil injecting pump for adding an edible oil to the pasta to prevent "sticking". A separate chamber with an exhaust blower connected thereto is provided adjacent the pot chamber to draw off steam and other cooking vapors.

15 Claims, 13 Drawing Figures

COOKING APPARATUS FOR PASTA AND THE LIKE

BACKGROUND OF THE INVENTION

1. Field of the Invention

This invention relates to food preparation equipment and more particularly to cooking apparatus which is capable of cooking pasta and other foods "to order" in individual portions.

2. Description of the Prior Art

With the rise in popularity of fast-food and take-out restaurants, a demand has arisen for cooking apparatus for pasta and other foods which must be cooked "to order" in individual sized portions. Such cooking apparatus must not only cook food quickly to eliminate customer waiting time and preserve the "fresh-cooked" quality of the food but must also be able to be operated by relatively unskilled attendants having little or no training in the culinary arts. In U.S. Pat. No 4,214,514 which was issued on July 29, 1980 to Peter Contino and Nicholas M. Stiglich, the latter being the inventor of the present invention, there is shown cooking apparatus for pasta products in which a plurality of pots, each containing an individual-sized portion, are mechanically moved from a lower or cooking position to a higher or drainage position by a relatively complex mechanical arrangement. The pasta is cooked in the lower position by a jet of very hot water which is recirculated and filtered. Although the cooking apparatus of the said patent cooks the pasta in a satisfactory manner, the apparatus itself is relatively expensive to manufacture and maintain and the time involved in raising and lowering the pots lengthens the customer's overall waiting time. Additionally, because of the capillary action inherent in pasta products, the cooked food retains water which may render the product unpalatable for some tastes.

SUMMARY OF THE INVENTION

It is an object of this invention to provide cooking apparatus of the type shown in the said U.S. Pat. No. 4,214,514 which is substantially less expensive to manufacture and maintain and which lessens the customer's overall waiting time.

It is a further object of this invention to provide cooking apparatus for pasta products and the like which includes means for eliminating the excess cooking fluid in the cooked product and which is capable of injecting an edible oil or other fluid in the cooked product to prevent sticking and provide a more palatable and easily handled product.

It is a still further object of this invention to provide cooking apparatus for pasta products and the like in which a plurality of pots containing individual-sized portions are injected with cooking fluid from a nozzle and drained without raising or lowering the pots or the nozzle.

It is an additional object of this invention to provide cooking apparatus for pasta products and the like in which delicate pastas are cooked by a gentle spiral action of injected hot water.

It is another object of this invention to provide cooking apparatus for pasta products and the like in which a novel venting arrangement is provided to prevent steam and other vapors from escaping from the cooking pots and annoying the attendant of the apparatus.

It is an additional object of this invention to provide cooking apparatus for pasta products and the like in which means are provided to minimize the possibility that the product may be overcooked.

Briefly, the cooking apparatus of the invention comprises a pot chamber and a plurality of pots disposed in said chamber. Each of the pots is sized to receive an individual portion of pasta therein and has a drainage opening in the bottom thereof. Means for supporting the pots in the chamber are provided as is a source of cooking fluid. A plurality of cooking fluid injector means is provided in said chamber beneath the pots for injecting cooking fluid into the pots. Each of the injector means has an injector nozzle adapted to be connected to the cooking fluid supply source. The nozzle has a head portion extending through the pot drainage opening and is so sized with respect to the pot drainage opening as to provide a pot drainage space therebetween. The nozzle head portion also has a nozzle opening therein which is disposewithin the pot. The cooking fluid injector means also has valve means on the nozzle head movable into first and second positions by the respective presence and absence of cooking fluid flow through the nozzle opening. The valve means is operable in said first position to close the pot drainage space and permit cooking fluid from the nozzle opening to enter the pot and is operable in said second position to open the pot drainage space and permit drainage of the cooking fluid from the pot. The cooking apparatus also includes control means for selectively connecting the injector nozzles of the cooking fluid injector means to the cooking fluid supply source to permit selective utilization of the pots for cooking.

Each of the pots has an inwardly-extending recessed portion in the bottom thereof surrounding the pot bottom drainage opening. The recessed portion has a plurality of apertures therein of such size as to permit the passage of cooking fluid therethrough but prevent the passage of pasta therethrough. The pot bottom recessed portion may comprise a mesh cylinder having one end thereof surrounding the pot bottom drainage opening and the other end thereof closed by a substantially imperforate cap. For the cooking of delicate pastas, the pot bottom recessed portion may comprise a substantially dome-shaped member surrounding the pot bottom drainage opening. The dome-shaped member has a plurality of involuted elongated openings in the wall thereof to produce spiral streams of cooking fluid from the nozzle opening and thereby impart a gentle swirling motion to the cooking fluid in the pot. The pot chamber may also include one or more pot spinning means for centrifugal drying of the cooked pasta and means for injecting an edible oil into the dried pasta. Finally, a novel venting arrangement is provided for eliminating steam and other cooking odors.

The nature of the invention and other objects and additional advantages thereof will be more readily understood by those skilled in the art after consideration of the following detailed description taken in conjunction with the accompanying drawings.

DESCRIPTION OF THE PREFERRED EMBODIMENT OF THE INVENTION

Figure 1:
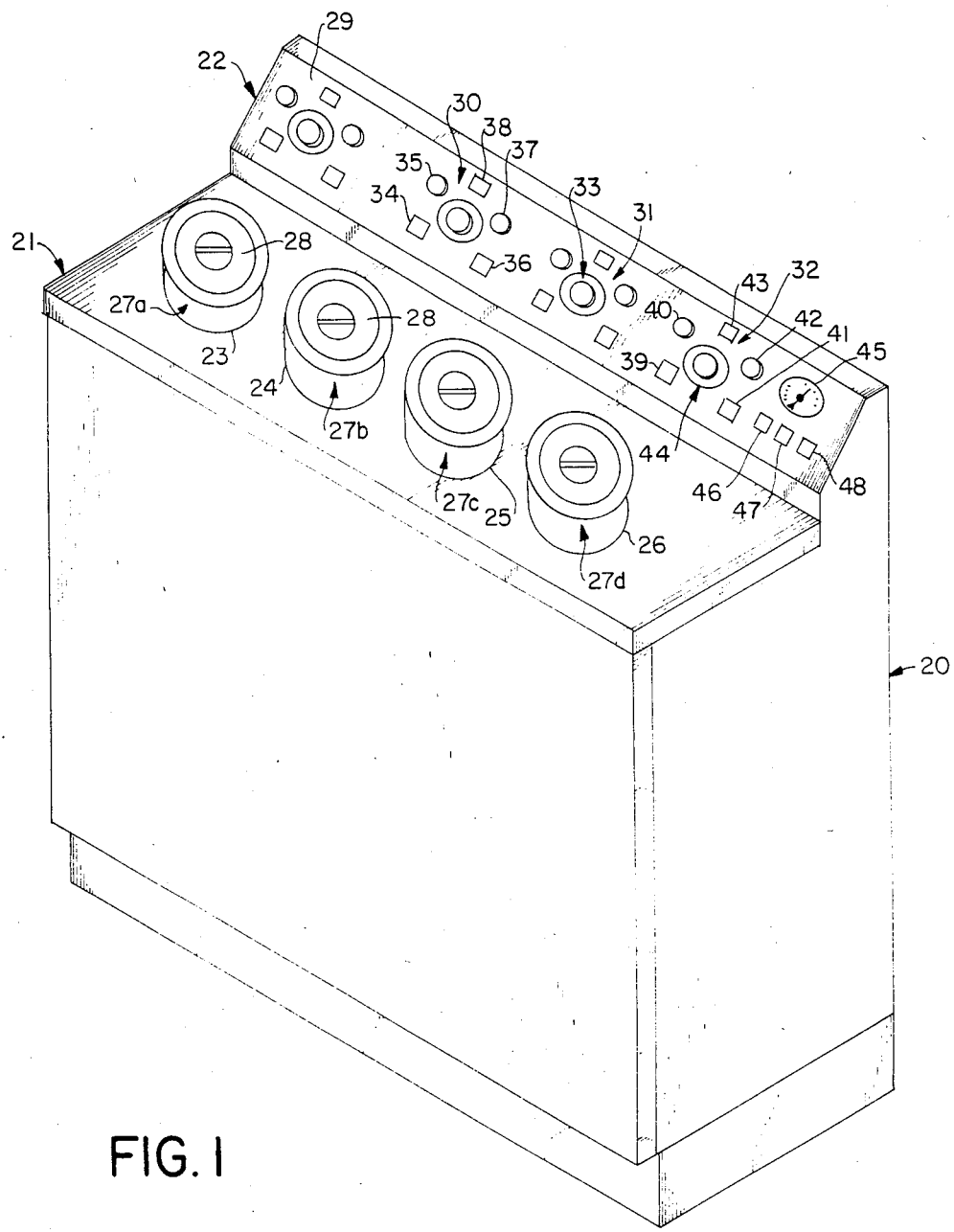
FIG. 1 is a perspective view of cooking apparatus for pasta products and the like constructed in accordance with the teachings of the present invention.

Referring now to FIG. 1 of the drawings, there is shown cooking apparatus for pasta products and the like constructed in accordance with the teachings of the present invention. As seen therein, the apparatus has a housing or cabinet, indicated generally as 20, which has a top cover, indicated generally as 21, and a control console, indicated generally as 22. The top cover is provided with a plurality of circular openings 23, 24, 25 and 26 in which are respectively disposed cylindrical cooking pots, indicated generally as 27A, 27B, 27C and 27D. Each pot is provided with a removable cover 28. The control console 22 is provided with control stations, indicated generally as 29, 30, 31 and 32, for controlling either the cooking or the drying of the pasta in the pots 27. Control stations 29, 30 and 31 control the cooking of pasta in the pots 27A, 27B and 27C respectively, while station 32 controls the drying and provides oil injection for the pasta in pot 27D. The cooking stations 29, 30 and 31 have identical controls which include a resettable timer, indicated generally as 33, a switch 34 for starting the cooking cycle, a signal light 35 which indicates that a cooking cycle is in progreee, a reject switch 36 to stop the cooking process before completion of the cycle, an end of cooking cycle light 37 and buzzer (not shown), and an attendant acknowledgement switch 38 which will deenergize the end of cooking cycle lamp 37 and the buzzer after the pot has been removed.

The control station 32 controls the pasta drying and oil injection operation for the pot 27D and includes a start cycle switch 30, a drying cycle in progress signal light 40, a reject switch 41 for interrupting the drying cycle before the end thereof, a signal lamp 42 and a buzzer (not shown) for signalling the end of the drying cycle, and attendant acknowledgement switch 43 for deenergizing the end of cycle lamp 42 and the buzzer after the cooking pot 27D has been removed from the apparatus and a resettable timer, indicated generally as 44. Finally, the control console 22 includes a gauge or indicator 45 which shows the temperature of the cooking fluid employed in the apparatus, a cooking fluid control switch 46 which controls the main cooking fluid supply system of the apparatus, a main pump operation control switch 47 and a filter backwash switch 48. The functions of these controls will be explained more in detail hereinafter.

Figure 2:
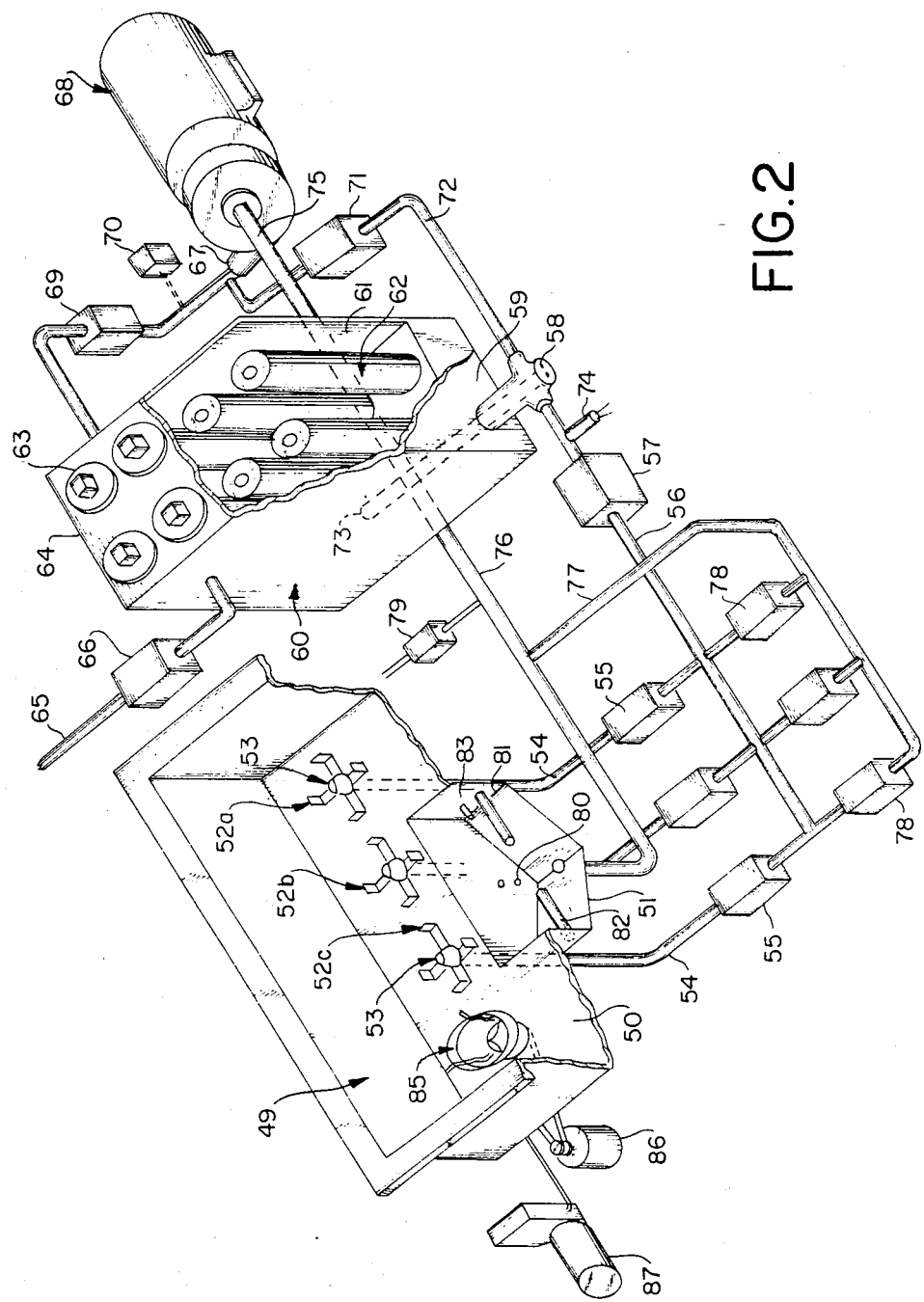
FIG. 2 is a schematic view of the cooking fluid supply system for the apparatus of FIG. 1 with a portion of the pot chamber and the filter chamber broken away to reveal details of construction.

Referring now to FIG. 2 of the drawings, there is shown a pot chamber, indicated generally as 49, in which the pots 27A through 27D are disposed. The chamber 49 is located immediately below the top cover 21 of the cooking apparatus and is provided with a bottom 50 in which a sump 51 is disposed. In the view of FIG. 2, the pot chamber 49 is viewed from the rear of the control console 22 looking toward the front of the housing 20. The bottom 50 of the pot chamber has secured thereto pot support means, indicated generally as 52A, 52B and 52C, which serve to receive and support the pots 27A, 27B and 27C, respectively. Each of the pot support means is provided with a cooking fluid injector means, indicated generally as 53, which is connected by a pipe 54 and a solenoid controlled valve 55 to a cooking fluid supply pipe 56. The fluid supply pipe 56 is connected by means of a solenoid controlled valve 57 and a tee fitting 58 to the output compartment 59 of a filter, indicated generally as 60. The output compartment 59 of the filter communicates with the input compartment 61 of the filter by means of a plurality of hollow, cylindrical filter elements, indicated generally as 62. Each of the filter elements is disposed substantially vertically in the filter enclosure 60 and is held in place by a removable cap 63 which is seated in an opening in the cover 64 of the filter compartment. Accordingly, each filter element may be separately removed for replacement or repair. The input filter compartment 61 is also connected to a waste disposal pipe 65 by means of a solenoid controlled valve 66 and to the output 67 of a main pump, indicated generally as 68, by means of a solenoid controlled valve 69. A fluid pressure sensitive switch 70 is connected to the output line of the pump.

The output 67 of the pump is connected by a solenoid controlled valve 71 and a pipe 72 to the other side of the tee fitting 58. The tee fitting 58 also provides access to a heating element 73 which is disposed in the bottom or output compartment 59 of the filter. A thermostat 74 senses the fluid temperature in the cooking fluid supply pipe 56 and controls the heating element 73 to bring the fluid to the proper temperature for cooking. The input 75 of the main pump is coupled by a fluid return pipe 76 to the sump 51 in the bottom of pot chamber 49 and to the cooking fluid supply pipe 56 by a return pipe 77 and three solenoid controlled valves 78. The cooking fluid return pipe 76 is also coupled to a source of fresh cooking fluid (not shown), such as water, for example, by means of a solenoid controlled valve 79 which is controlled by a fluid level sensor 80 in the sump 51. The sump 51 also contains a pair of heating elements 81, 82 which are controlled by thermostats 83, 84, respectively. The thermostat 84 is not visible in view of FIG. 2 but is located in approximately the same position as thermostat 83 on the other side of the sump. The bottom 50 of the pot chamber 49 also contains pot spinning means, indicated generally as 85, which support and spin pot 27D during the drying cycle. As will be explained hereinafter, pot 27D is rotated by a drying cycle motor 86 and is supplied with an edible oil by an oil supply pump 87, both of which are located under the pot chamber 49.

Figure 3:
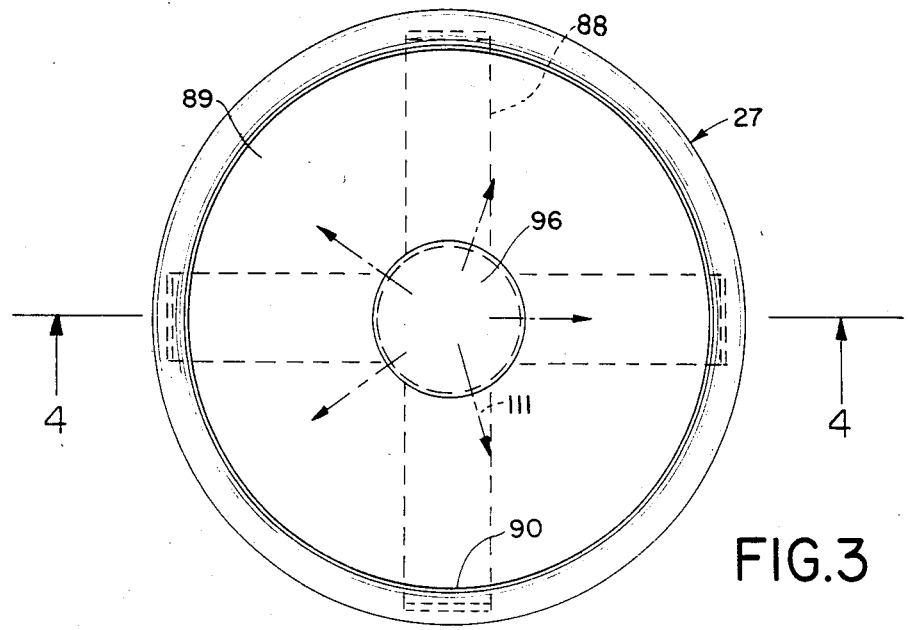
FIG. 3 is a top plan view of one of the cooking pots used in the apparatus of the invention with the top cover removed.
Figure 4:
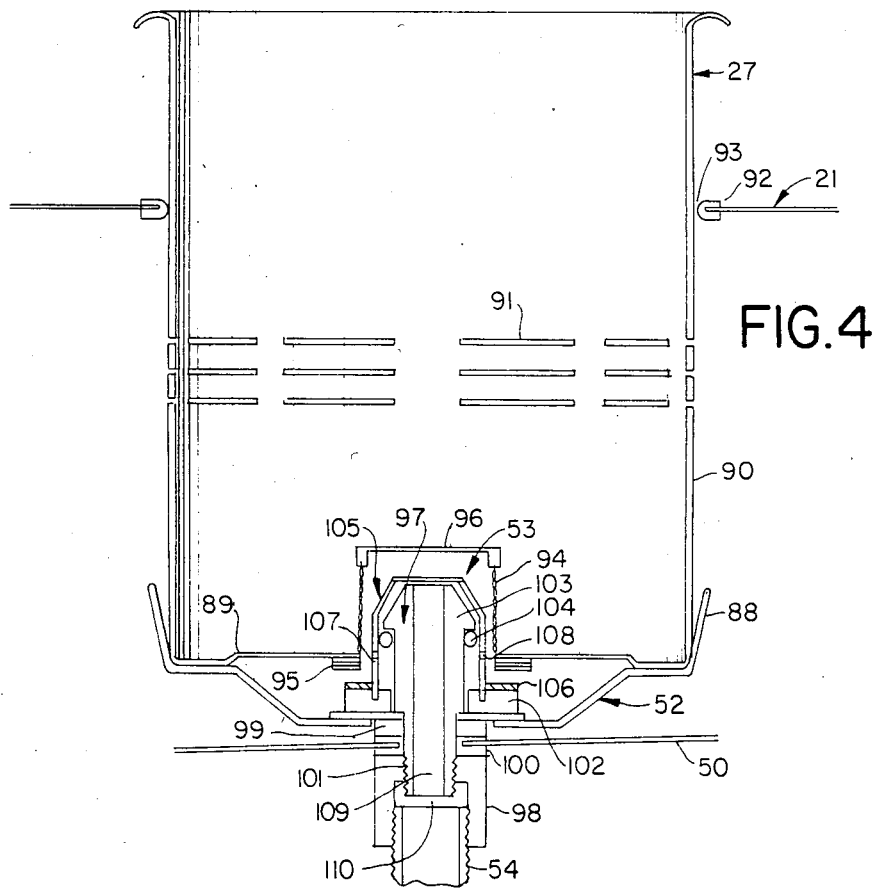
FIG. 4 is a full sectional view of the cooking pot of FIG. 3 taken along the line 4—4 of FIG. 3.

The pot support means 52 and the cooking fluid injector means 53 for the cooking pots 27A–27C are shown in FIGS. 3 and 4 of the drawings. As seen therein, each of the pot support means 52 comprises a cruciform-shaped support element having four support arms 88 which engage the periphery of the bottom 89 of the cylindrical cooking pot 27. The side wall 90 of the cooking pot is provided with three rows of peripherally-disposed slots 91 which are so located as to be beneath the top cover 21 of the cooking apparatus housing. The openings 23, 24 and 25 in the top cover are provided with an annular sealing strip or collar 92 so that only a very small space 93 exists between the wall of the pot and the sealing collar. The spacing is such that, although the pot may be easily withdrawn from the opening, the splashing of cooking fluid outside of the pot chamber is prevented. The bottom 89 of the pot is provided with a circular drainage opening in which is disposed a cylindrical mesh member 94 which will permit the passage of cooking fluid therethrough but which will prevent the pasta in the pot from escaping through the pot bottom drainage opening. The mesh element is secured to the bottom of the pot by an annular mounting flange 95 and the top of the mesh is supported and enclosed by a substantially imperforate circular cap 96.

The cooking fluid injector means 53 has a nozzle, indicated generally as 97, which is supported by a mounting assembly consisting of a lower mounting element 98, an upper mounting element 99 and a compression gasket 100. The nozzle 97 has a lower, reduced diameter portion 101 which threadedly engages the lower mounting member 98. Since the compression gasket 100 is located between the lower mounting member 98 and the upper mounting member 99, as the lower mounting member 98 is tightened, the gasket 100 expands to fill the space between the lower portion 101 of the nozzle and the opening formed in the bottom 50 of the pot chamber 49 to thereby produce a fluid-tight seal. The radially-disposed arms 88 of the pot support means 52 are mounted on an annular flange 102 which is formed on the upper support member 99, so that a mechanically-stable support is provided for both the pot 27 and the fluid injector means 53.

The nozzle 97 has an upper portion or head 103 which is offset to receive a toroidal seal 104, such as an O-ring, for example. A substantially cylindrical, "hat-shaped" valve member indicated generally as 105, is slidably disposed on the head 103 of the nozzle so that the toroidal seal 104 provides a fluid-tight seal between the head of the nozzle and the hat-shaped valve member 105. The hat-shaped member 105 has an outwardly-extending flange portion adjacent the open or lower end thereof on which is mounted an annular sealing gasket 106 which is adapted to engage the annular flange 95 on the bottom 89 of the cooking pot when the valve member is moved vertically upwards. The cylindrical side wall 107 of the crown portion of the member 105 is provided with a plurality of peripherally disposed apertures 108 at a point along the length of the crown portion which is below the sealing ring 104 when the member 105 is in a lowered position but is between the sealing ring and the closed end of the crown portion of the member when the member is in the raised position. The nozzle 97 is provided with a centrally-disposed passageway 109 which communicates with a cylindrical opening 110 formed in the lower mounting member 98 and also with the interior of the hat-shaped valve member 105. Finally, the opening 110 in the lower mounting member is internally threaded to receive the end of fluid supply pipe 54 with a fluid-tight seal.

By virtue of the foregoing arrangement, when cooking fluid under pressure is supplied to the pipe 54, the fluid passes through the opening 109 in the nozzle and impinges against the underside of the crown portion of the hat-shaped member 105 thereby forcing the member vertically upwards into a first position wherein the sealing ring 106 is forced against the annular flange 95 on the bottom of the pot to create a substantially fluid-tight seal therebetween. When the member 105 is moved upwards to the foregoing first position, the apertures 108 in the side wall of the member are disposed above the sealing ring 104, so that the fluid issuing from the nozzle passes through the openings 108 and is directed through the cylindrical mesh element 94 on the bottom of the pot. As seen in FIG. 3, the cooking fluid enters the bottom of the pot in a series of radially disposed streams indicated by the arrows 111. When cooking fluid under pressure is no longer supplied to the pipe 54, the pressure against the underside of the hat-shaped member 105 ceases and the cap is moved vertically downward to its second or lowered position by the force of cooking fluid escaping from the pot. The fluid in the pot drains through the cylindrical mesh element 94 and the annular pot drainage space existing between the nozzle and the pot bottom drainage opening into the pot chamber 49 and subsequently into the sump 51.

Figure 5:
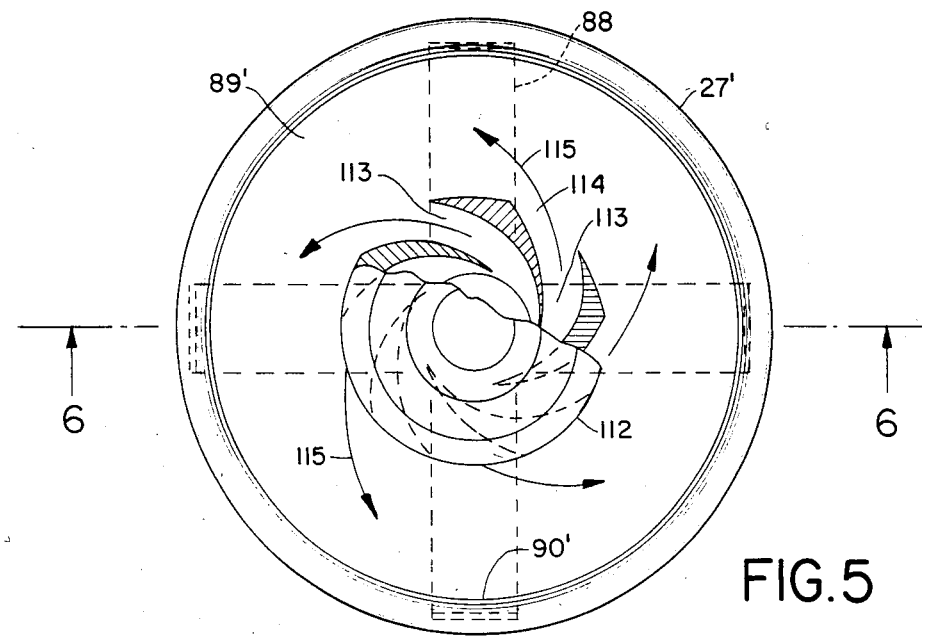
FIG. 5 is a top plan view of another form of cooking pot with the top cover removed and a portion of the involuted cap in the bottom of the pot broken away to reveal details of construction which may be used for the cooking of delicate pasta products.
Figure 6:
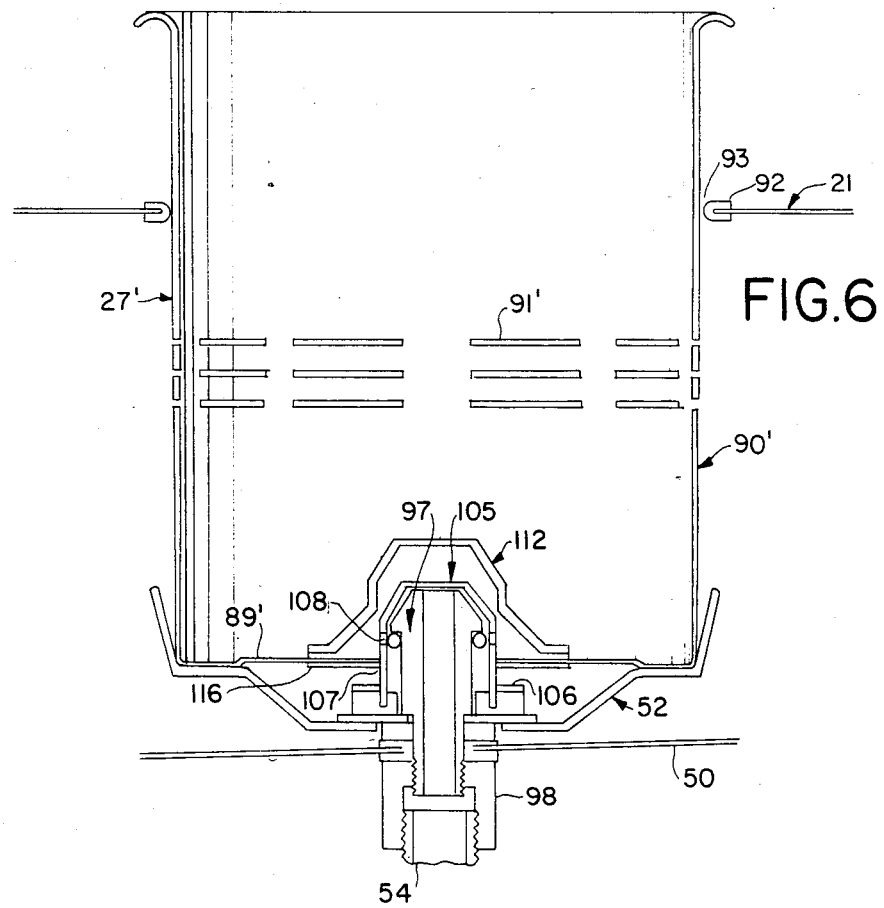
FIG. 6 is a full sectional view of the cooking pot of FIG. 5 taken along the line 6—6 of FIG. 5.

A modified cooking pot 27' for cooking delicate pastas is shown in FIGS. 5 and 6 of the drawings wherein reference numerals with a prime notation will be employed to designate elements which are the same as or similar to correspondingly numbered elements in the pot of FIGS. 3 and 4 of the drawings. So-called "delicate" pastas are pastas such as ravioli for example, which would be torn apart by ordinary cooking and which require a gentle stirring action to be sure that they are thoroughly cooked and do not clump together. The cooking pot shown in FIGS. 5 and 6 is the same as the cooking pot shown in FIGS. 3 and 4 except that the cylindrical mesh 94 and the circular cap 96 which enclose the drainage opening in the bottom 89 of the pot are replaced by a substantially dome-shaped member or cap, indicated generally as 112, which is provided with involuted channels or openings 113 in the wall thereof. When the cooking fluid leaves the nozzle 97 through the peripherally-disposed openings 108, the streams of fluid strike the walls 114 of the channels 113 and are caused to assume the spiral fluid flow shown by the arrows 115 in FIG. 5 so that a gentle swirling motion is imparted to the cooking fluid in the pot. This modified form of pot may be employed at any of the cooking stations 29, 30 and 31 since the pot support means 52 and the fluid injection means 53 is the same for all of these stations and will readily accomodate the involuted cap 112. The annular sealing ring or gasket 106 on the hat-shaped member 105 will engage the underside 116 of the bottom of the pot to provide a fluid-tight seal when the member is raised to its elevated position under fluid pressure.

Figure 7:
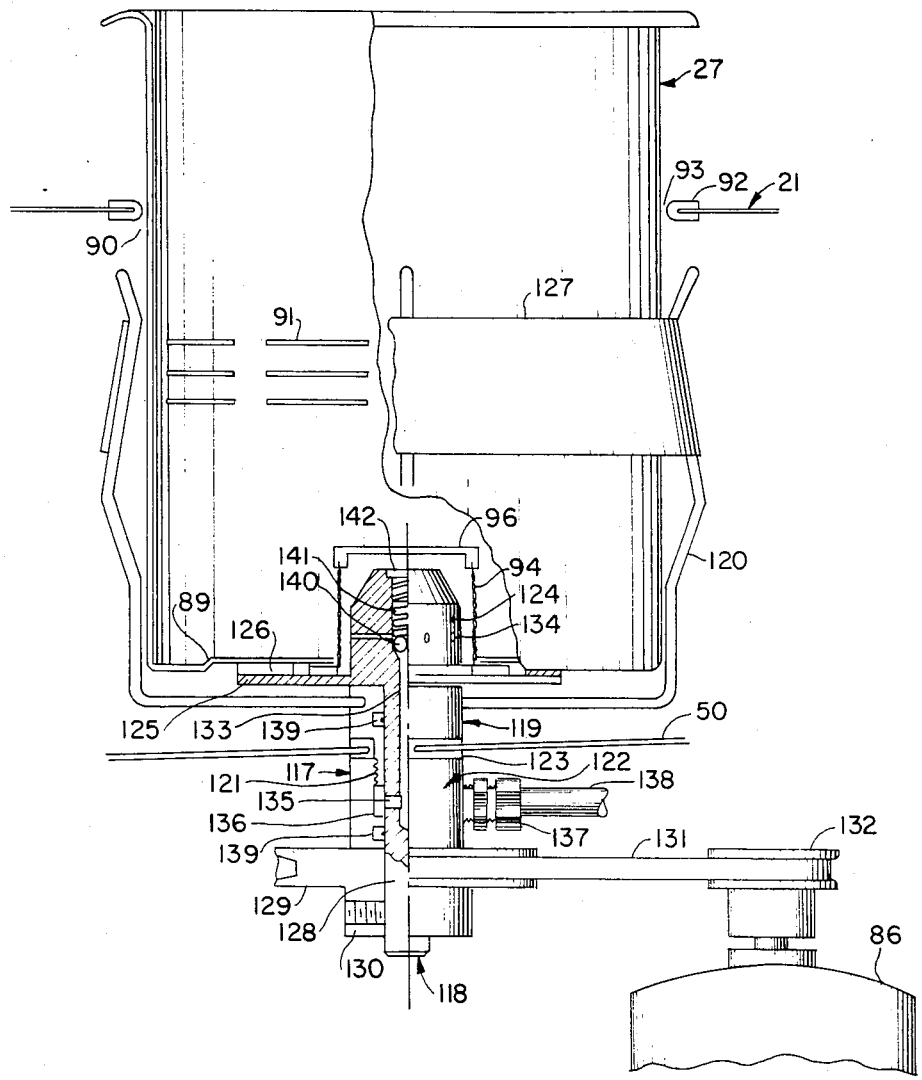
FIG. 7 is a side elevational view of the pasta drying means and oil injection means of the invention with a portion of the drying spindle, spindle support and cooking pot broken away to reveal details of construction.

The pot spinning means 85 which rotates the cooking pots to dry the pasta during the drying cycle is shown in FIG. 7 of the drawings as comprising a bearing assembly, indicated generally as 117, having a spindle, indicated generally as 118, rotatably disposed therein. The bearing assembly 117 has an upper bearing member, indicated generally as 119, on which is mounted a plurality of upwardly and outwardly extending support arms or "fingers" 120 which form a cage in which the cooking pot 27 is enclosed. The upper bearing member 119 has an offset portion 121 of reduced diameter which passes through an opening in the floor 50 of the pot chamber 49 and threadedly engages a bore or opening in a lower bearing member, indicated generally as 122, of the bearing assembly 117. An annular sealing gasket 123 is disposed about the offset portion 121 of the upper bearing member 119 in the opening in the floor 50 of the pot chamber, so that as the lower bearing member 122 is tightened, the gasket 123 expands to provide a fluid-tight seal between the floor 50 and the bearing assembly 117.

The spindle 118 is rotatably seated in the bearing assembly 117 and has a head portion 124 which is concentrically disposed in the cylindrical mesh 94 of the cooking pot 27. The head portion 124 has a radially outwardly-extending flange 125 formed thereon which is provided with an annular ring 126 of a material, such as rubber, for example, which has a high coefficient of friction. The frictional material 126 engages the bottom 89 of the cooking pot so that as the spindle 118 is rotated, the pot is also rotated to expel the excess water in the pasta out through the slots 91 in the side wall 90 of the cooking pot. In order to prevent splattering of the expelled cooking fluid, the fingers 120 of the cage are bent inwardly and are provided with a band 127 of plastic or other suitable material to deflect the fluid downwardly into the pot chamber. The opening 26 in the top cover 21 of the housing for the cooking apparatus in which the spinning pot is disposed is also provided with one of the annular collars 92 so that only a small space 93 exists between the collar and the side wall 90 of the pot to further prevent the escape of expelled fluid. The spindle 118 also has an offset portion 128 of reduced diameter on which is mounted a pulley 129 by means of a set screw 130. The pulley 129 is connected by a belt 131 to another pulley 132 mounted on the shaft of spinning or drying motor 86.

The spindle 118 is provided with a longitudinally-extending bore 133 therein which communicates with a plurality of radially outwardly-extending bores 134 in the head 124 of the spindle. The longitudinal bore 133 also communicates with one or more radially-extending bores 135 which are formed in the lower portion 128 of the spindle and which in turn communicate with an annular groove 136 formed in the lower bearing member 122. The annular groove 136 communicates with a fitting 137 on the lower bearing member which is coupled by a pipe 138 to the oil injection pump 87 in the housing of the apparatus. A pair of toroidal seals 139, such as O-rings, for example, are disposed about the spindle at points above and below the annular groove 136 so that the oil is prevented from escaping during rotation of the spindle. The upper portion of the longitudinally-extending bore 133 in the spindle terminates in a longitudinally-extending bore of larger diameter in which is seated a ball 140 which is biased against the smaller diameter bore by means of a helical compression spring 141 and a cap 142 which threadedly engages the head 124 of the spindle. The ball 140 and spring 141 function as a check valve which permits the oil injected under pressure during the drying cycle from pump 87 to be expelled through the radially-disposed bores 134 in the spindle head but prevents cooking fluid in the pot from entering the oil injection system.

By virtue of the foregoing arrangement, when the cooking cycle is completed at one of cooking stations 29, 30 or 31, the pot containing the cooked pasta may be transferred by the attendant to the drying cycle station 32 where it is spun by spinning motor 86 to expel the cooking fluid by centrifugal force. During the spinning or drying cycle, oil from the oil injection pump 87 fills the annular groove 136 in the lower bearing member 122, passes through the radially-disposed bores 135 and the longitudinal bore 133 of the spindle and enters the cooking pot through the radial bores 134 of the spindle head and the cylindrical mesh 94 of the cooking pot. The "oil" referred to herein may constitute a suitable cooking oil such as olive oil, for example, or may comprise other oil based materials which will coat the pasta during the drying cycle and prevent the strands from sticking together.

Figure 8:
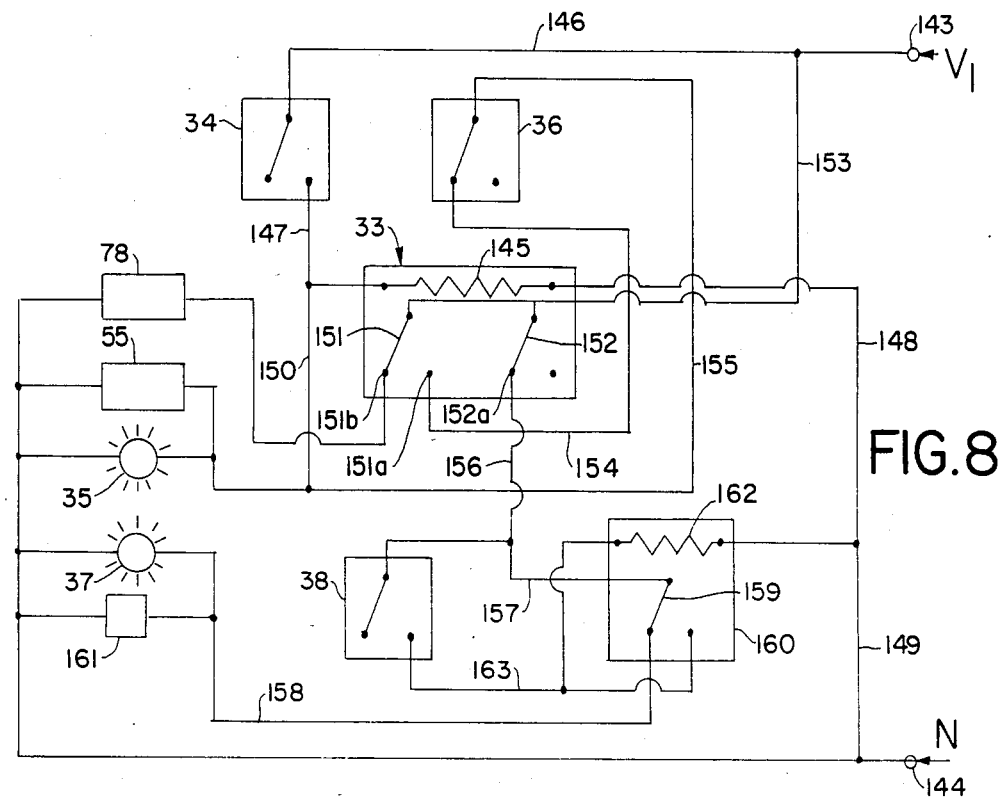
FIG. 8 is a schematic circuit diagram of the control circuit for controlling the flow of cooking fluid to an individual pot.

A control circuit which may be employed to control the cooking cycle for each of the pots 27A, 27B and 27C at cooking stations 29, 30 and 31, respectively, is shown in FIG. 8 wherein it is seen that one input terminal 143 of the circuit is connected to a voltage source $V_1$, which may comprise +115 volts A.C., for example, while the other input terminal 144 is connected to neutral N which may be grounded, if desired. The resettable timer 33 which may comprise a timer of the motor driven type, for example, has its control winding 145 connected between the voltage source $V_1$ and neutral N by means of leads 146, 147, 148 and 149 and the start switch 34 so that when start switch 34 is closed, the winding is energized to start the cooking cycle. The activation of start switch 34 also energizes solenoid controlled valve 55 through lead 150 so that the cooking pot is filled with the cooking fluid supplied by the main pump 68 and the cooking cycle in progress lamp 35 is energized to indicate that the cooking station involved is being utilized. The timer 33 has movable contacts 151 and 152 which are connected to the voltage source $V_1$ by a lead 153. The movable contact 151 contacts fixed contact 151A at the start and during the cooking cycle and shifts to fixed contact 151B when the cooking cycle is completed. Fixed contact 151A is connected by leads 154 and 155 and reject switch 36 to the solenoid valve 55 and the signal lamp 35 so That when start switch 34 (which may be of a momentary contact type) is released the solenoid valve 55 and signal lamp 35 remain energized.

At the end of the cooking cycle, the movable contacts 151 and 152 assume the position shown in the drawing wherein contact 151 contacts fixed contact 151B which is connected to the solenoid controlled valve 78 which returns the water from the main pump 68 directly back to the pump intake by means of pipes 76 and 77. At this time, the valve 55 and the cooking cycle in progress lamp 35 are deenergized so that the flow of cooking water to the pot is shut off. Also at this time, the movable contact 152 of timer 33 assumes the position shown in the drawing and contacts a fixed contact 152A which is connected by leads 156, 157 and 158 and the movable contact 159 of a relay 160 to the end of cooking cycle signal lamp 37 and an end of cooking cycle buzzer 161, so that the lamp 37 and the buzzer 161 are energized to signal the end of the cooking cycle. When the attendant removes the pot of cooked pasta he or she activates attendant acknowledgement switch 38 so that the control winding 162 of relay 160 is energized through a circuit comprising lead 153, movable contact 152 of timer 33, lead 156, the attendant acknowledgement switch 38, and leads 163 and 149. When the control winding 162 of relay 160 is energized, movable contact 159 switches so that end of cooking cycle signal lamp 37 and the buzzer 161 are deenergized to thereby indicate that the particular cooking pot and cooking station are no longer being used and may be employed for cooking for another customer. Since the reject switch 36 is in the latching circuit for the cooking fluid intake valve 55 and the cooking cycle in progress signal lamp 35, it will deenergize the valve and the lamp if, for any reason, the attendant desires to interrupt the cooking cycle.

Figure 9:
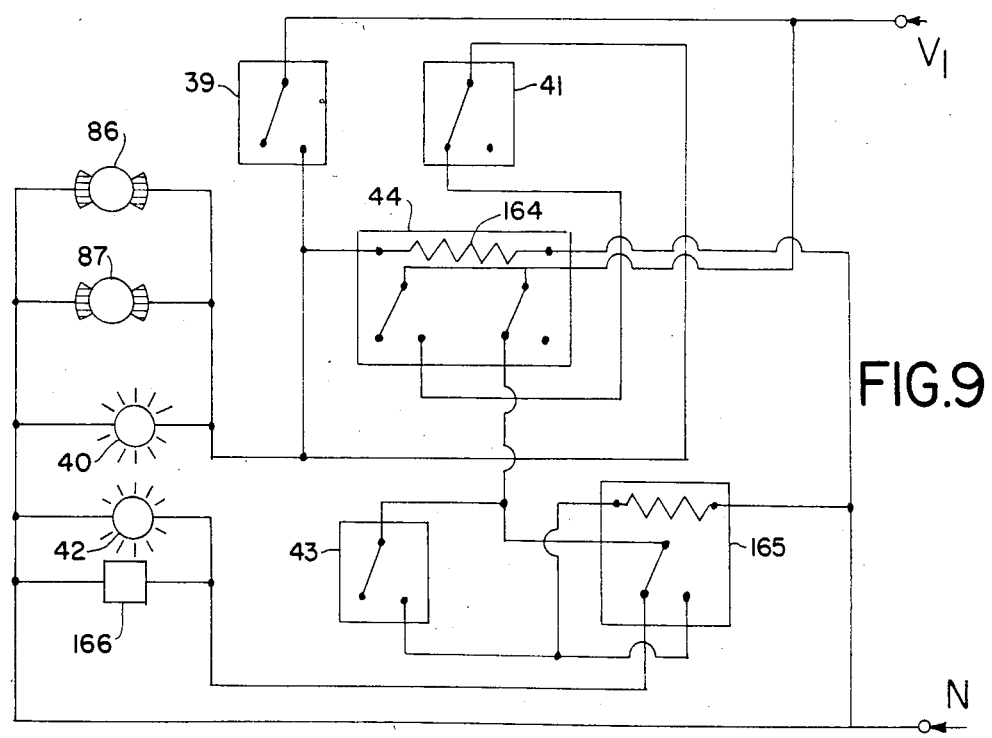
FIG. 9 is a schematic circuit diagram of the control circuit for the drying means and oil injection means of the apparatus of the invention.

The control circuit for the pasta drying station 32 is shown in FIG. 9 and operates in essentially the same manner as the control circuit in FIG. 8. When the drying cycle start switch 39 is activated, the control winding 164 of timer 44 is energized together with the spin motor 86, the oil supply pump 87 and the drying cycle in progress signal lamp 40. Again, a contact of timer 44 provides a latching circuit through reject button 41 so that the drying cycle may be interrupted by the attendant before the completion thereof. Attendant acknowledgement switch 43 and a relay 165 perform essentially the same functions as the switch 38 and the relay 160 in the circuit of FIG. 8 so that the end of drying cycle signal lamp 42 and an end of drying cycle buzzer 166 are energized at the end of the drying cycle and the attendant may signal removal of the pot of dried pasta by activating the acknowledgement switch 43. Again, as in the circuit of FIG. 8, the position of the movable contacts of the timer 44 and the relay 165 are shown in the positions they assume at the end of the drying cycle.

Figure 10:
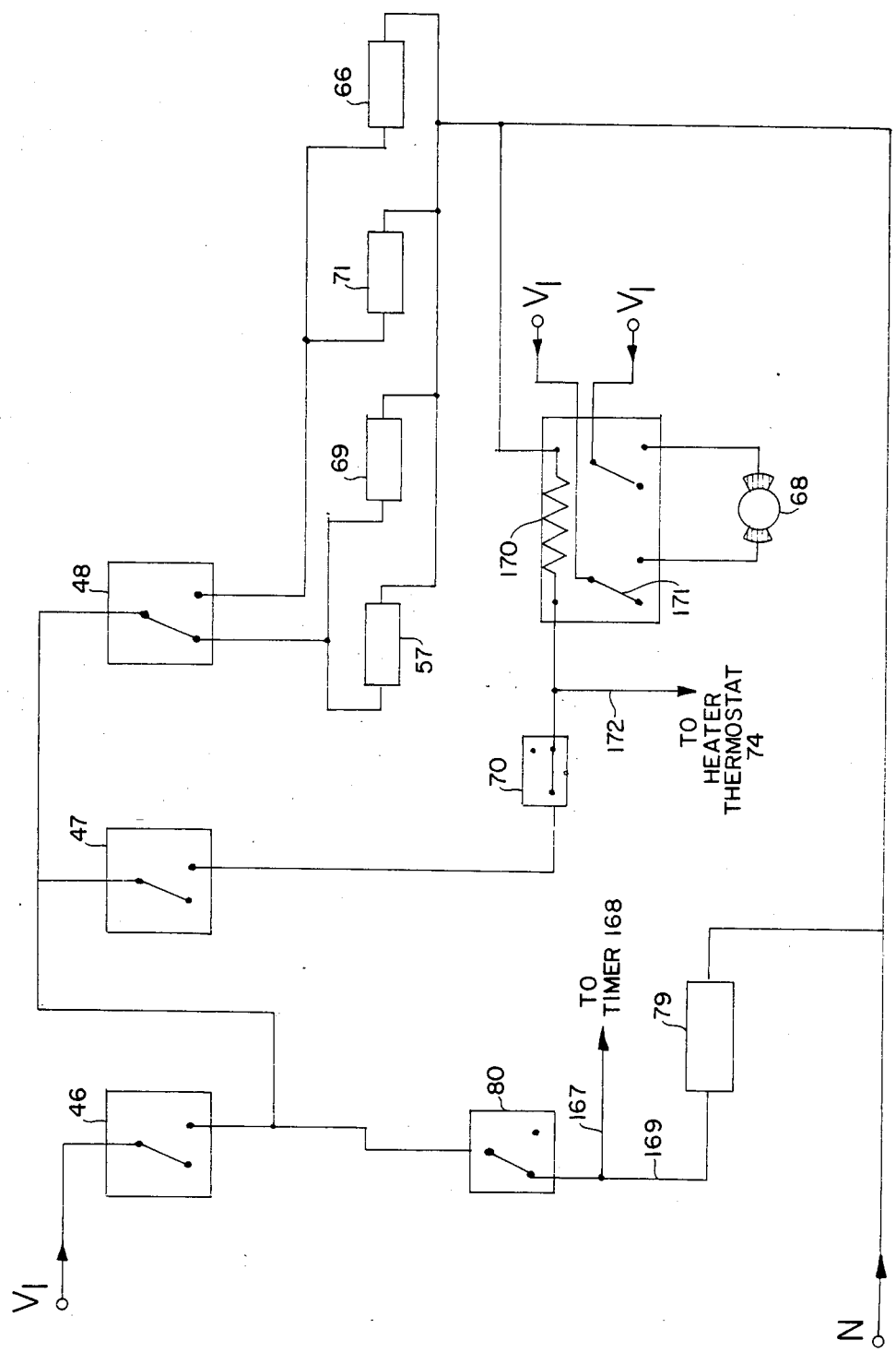
FIG. 10 is a schematic circuit diagram of the control circuit for the cooking fluid pump and associated main supply system.

The control circuit for the cooking fluid supply system and the main pump is shown in FIG. 10 wherein it is seen that the cooking fluid control switch 46 is arranged to energize the cooking fluid level sensor 80, the main pump control switch 47 and the backwash switch 48 from the voltage source $V_1$. The fluid level sensing switch 80 is coupled by a lead 167 to a timer 168, which will be described in connection with FIG. 11 of the drawings, and by a lead 169 to the fresh cooking fluid intake valve 79. Accordingly, when the master cooking fluid control switch 46 is activated, the level sensor 80 senses the level of the fluid in sump 51 and, if additional fluid is required, energizes fluid intake valve 79 to admit fresh fluid until the prescribed fluid level is reached. The activation of master switch 46 also energizes pump system swit-h 47, so that when the latter switch is activated, it energizes the control winding of a relay 170 through the pressure sensing switch 70 which is disposed in the output 67 of main pump 68. When the control winding of relay 170 is energized, the movable contacts 171 of the relay switch and couple the main pump motor 68 across the voltage source $V_1$-$V_2$, where $V_2$ may conveniently comprise −115 volts A.C. The output from the fluid pressure sensing switch 70 is also coupled by a lead 172 to the last-stage heater thermostat 74 as will be described in connection with FIG. 11.

With the backwash switch 48 in the normally-closed position illustrated in FIG. 10, it is seen that solenoid controlled valves 57 and 69 are energized so that the output from main pump 68 is applied to the input chamber 61 of the filter 60, forced through the filter, and to emerge from the output filter chamber 59 at the tee fitting 58 where it passes through main fluid supply pipe 56 to the solenoid controlled valves 55 which supply the individual cooking stations with cooking fluid. When the backwash switch 48 is activated, it closes the valves 57 and 69 and causes valves 66 and 71 to open, so that the output from the main pump 68 passes through the pipe 72 and the tee fitting 58 to the output filter compartment 59. From that point, the fluid passes in a reverse direction through the filter cylinders 62 and out through the waste pipe 65 to a waste disposal site. Accordingly, for as long as the backwash switch 48 is activated, the filter 60 will be backwashed. When this switch is released, however, the cooking fluid control valves 57 and 69 will reverse to their normally open positions, so that cooking fluid from the pump 68 is ready to be applied to the individual cooking stations through the solenoid controlled valves 55.

Figure 11:
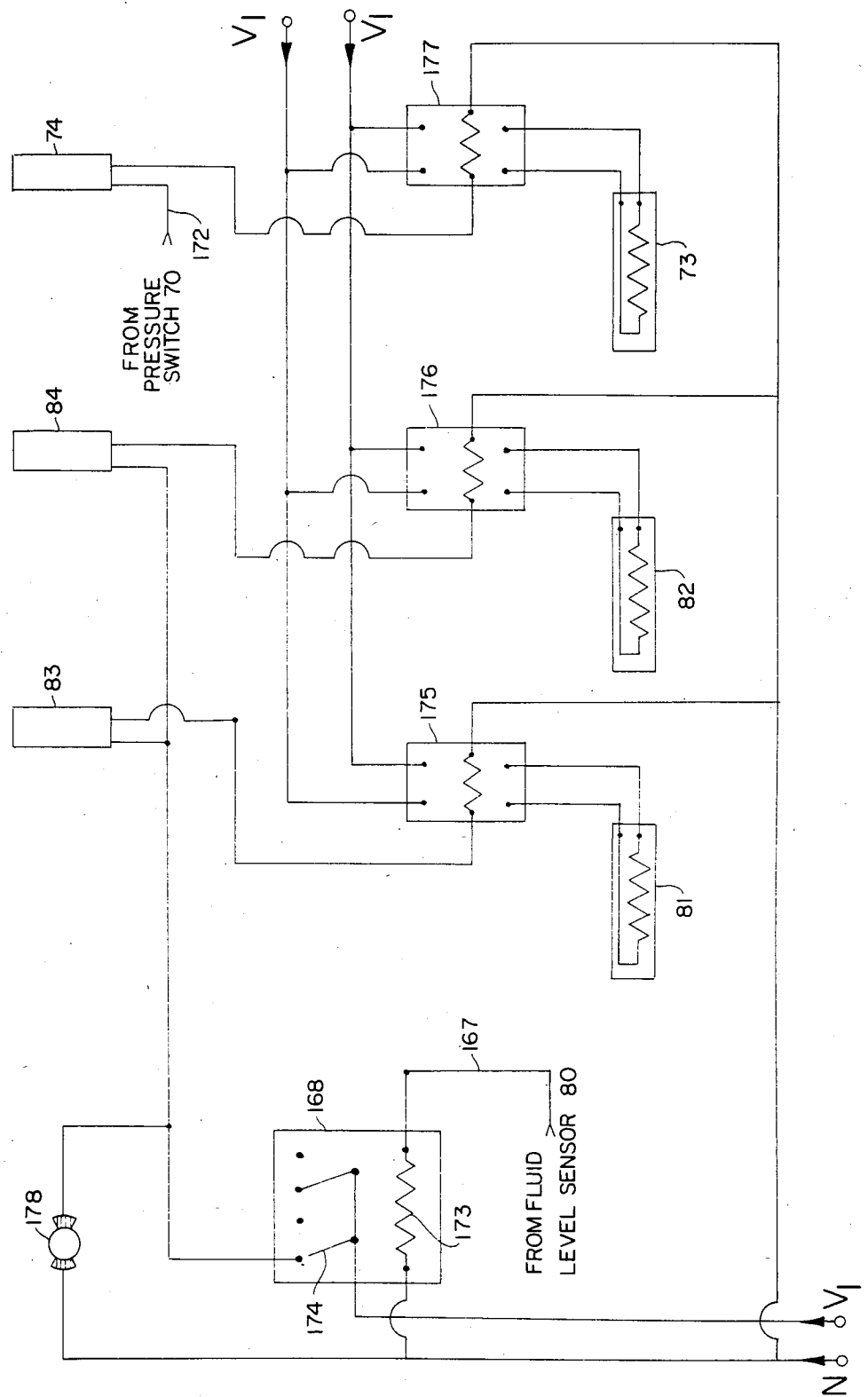
FIG. 11 is a schematic circuit diagram of the control circuit for the various cooking fluid heating elements of the apparatus of the invention.

FIG. 11 shows a circuit which may be employed to control the various heater elements of the cooking apparatus of the invention. As seen therein, when cooking fluid level sensor 80 and the master control switch 46 are activated as shown in FIG. 10 of the drawings, the voltage $V_1$ is applied to the control winding 173 of a timer 168. As shown, the movable contact 174 of the timer is arranged to energize the thermostats 83 and 84 which control the heating elements 81 and 82, respectively. If the fluid level in sump 51 is too low, the level sensing switch 80 will open and deenergize the control winding 173 of timer 168 so that the heating elements 81 and 82 will be deenergized. The purpose of the timer 168 is to provide a predetermined time during which the thermostats 83 and 84 are energized so that if the sump 51 is slow in filling up, the heaters will not be deenergized. If, however, through a mechanical failure, the sump 51 does not fill to the prescribed level, the timer 168 will deenergize the thermostats 83, 84 and will therefore shut down heating elements 81, 82. The thermostats 83 and 84 serve to energize relays 175 and 176, respectively, which apply the voltage $V_1$-$V_2$ to the heating elements 81, 82. The heating elements and thermostat control arrangement are more particularly described in the aforesaid U.S. Pat. No. 4,214,514.

The last-stage heater element 73 which is controlled by thermostat 74 through a relay 177 is energized through the pressure switch 70 so that if the water pressure in the cooking fluid supply system should become excessive, the last-stage heater is deenergized. When a substantial number or all of the cooking pots 27 are being used and the demand for cooking fluid is at its peak, all three of the heating elements 81, 82 and 73 will be energized. At off-peak operation, the heaters 81 and 82 will maintain the temperature of the cooking fluid in the sump 51 at an adequate level to cook the pasta in the pots 27. The last-stage heater 73 provides a reserve heating source which may be employed to quickly bring the cooking fluid to the desired temperature during peak demand periods. It will be noted that when the master control switch 46 is activated, and the timer 168 is operative, an exhaust blower motor 178 is also energized for a purpose which will now be described.

Figure 12:
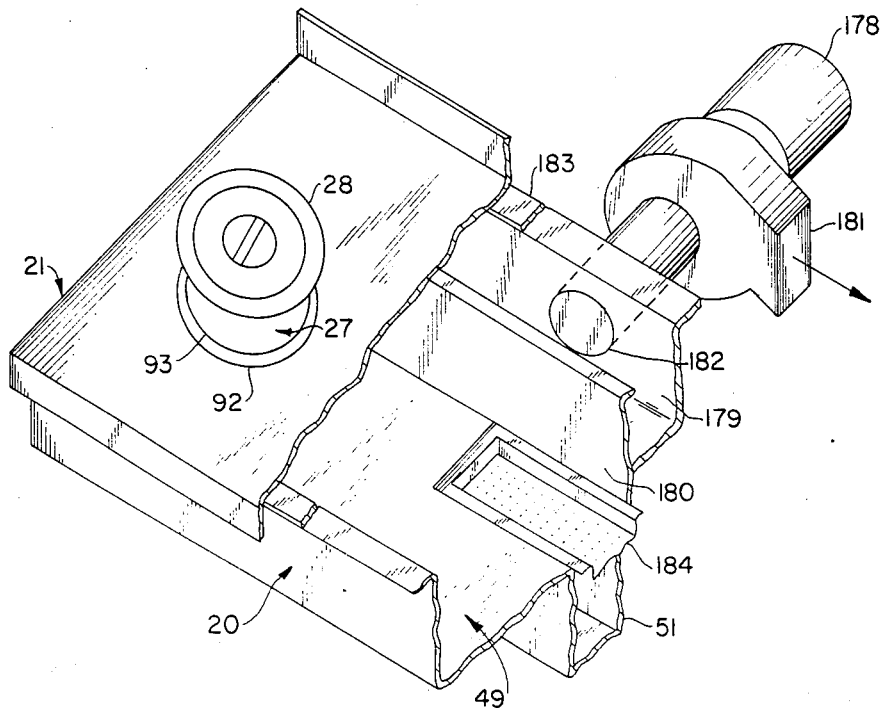
FIG. 12 is a perspective view of the top portion of the cooking apparatus of the invention with a portion of the top cover of the cabinet broken away and the control console removed to reveal details of construction of the steam venting arrangement of the invention.

A novel venting arrangement for drawing off steam and other vapors produced during the cooking and drying cycles is shown in FIG. 12 of the drawings wherein it is seen that the pot chamber 49 is separated from an adjacent chamber 179 by means of a wall or divider 180 which does not quite reach the height of the top cover 21 of the housing 20 of the cooking apparatus so that the small gap created permits a flow of air from chamber 49 to chamber 179. The motor 178 is mechanically connected to an exhaust blower 181 which evacuates the air in chamber 179 through a mesh filter 182. The top cover 21 of the housing of the apparatus is seated on the tops of chambers 49 and 179 bymeans of a gasket 183, so that when the blower 181 operates, the air pressure in chamber 179 is lowered to thereby draw air, steam and other vapors from the chamber 49 over the wall 180 to thereby prevent such air, steam and other vapors from passing through the opening 93 between the cooking pots 27 and the collar 92 in the top 21 of the housing. As seen in FIG. 12, a rectangular filter 184 may be disposed over the top of the sump 51 in the floor of pot chamber 49 to prevent the passage of large particles of pasta and the like into the main cooking fluid pumping system.

Figure 13:
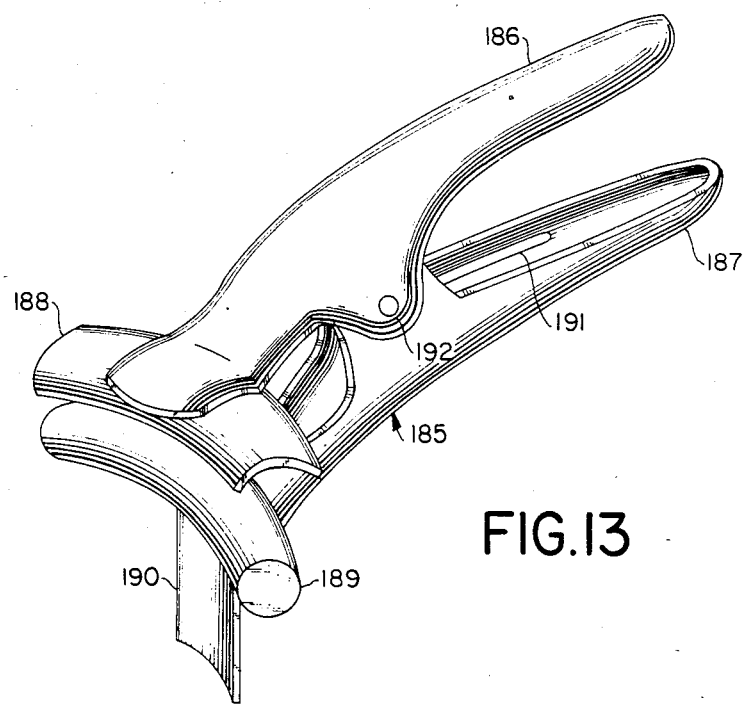
FIG. 13 is a perspective view of a removable pot handle which may be employed to handle the cooking pots of the apparatus of the invention.

A handle or tongs, indicated generally as 185, which is suitable for handling the cooking pots 27 is shown in FIG. 13 of the drawings wherein it is seen that the handle comprises an upper handle portion 186 and a lower handle portion 187. The upper handle 186 is provided with an arcuate jaw portion 188 which substantially matches the curvature of the rim of the cooking pots 27. The lower handle 187 is provided with a substantially toroidal jaw portion 189 which engages the underside of the rim of the cooking pots 27. The lower jaw 189 has a vertically-depending stabilizer portion 190 which engages the wall 90 of the cooking pot 27 so that a firm grip may be had upon each cooking pot. A spring 191, such as a leaf spring or a coil spring, for example, is disposed about the pivot point 192 of the handles so that the handle portions are biased apart and the jaws are biased together. Accordingly, the attendant of the cooking apparatus may apply the handle or tongs to a particular cooking pot and move the pot about from the cooking station to the drying station and ultimately to the customer's plate. The handle 185 provides a quick and secure grip on the cooking pots 27.

By virtue of the foregoing arrangement, it is seen that a large number of portions of pasta or other food products may be cooked to order in a short period of time with minimum supervision by the cooking attendant. The cooking and drying cycles are timed and suitable indicating means are provided so that the cooking attendant need spend only a minimum amount of time on the order for each customer. Furthermore, the pasta or other products cooked will always be cooked in the shortest possible time. The novel cooking fluid injector means of the invention enables each pot to be filled with cooking fluid and drained in the shortest possible time, since the pot itself need not be raised and lowered as in the aforesaid U.S. Pat. No. 4,214,514. The timers and attendant acknowledgement switches minimize the possibility that the pasta will be overcooked or left too long in the pot after cooking or drying.

It is believed apparent that many changes could be made in the construction and described uses of the foregoing cooking apparatus and many seemingly different embodiments of the invention could be constructed without departing from the scope thereof. For example, the number of cooking or drying stations in the cooking apparatus could be expanded or reduced to suit the requirements of the restaurant or other cooking establishment. Similarly, any or all of the cooking pots could be replaced by the modified version of pot which is suitable for cooking delicate pastas. Finally, it is understood that the cooking apparatus of the invention may be employed to cook other foods than pasta. Accordingly, it is intended that all matter contained in the above description or shown in the accompanying drawings shall be interpreted as illustrative and not in a limiting sense.

What is claimed is:

1. Cooking apparatus for pasta and the like comprising
   a pot chamber;
   a plurality of pots disposed in said chamber, each of said pots being sized to receive an individual portion of pasta therein and having a drainage opening in the bottom thereof;
   means for supporting said pots in said chamber;
   a source of cooking fluid;
   a plurality of cooking fluid injector means in said chamber beneath said pots for injecting cooking fluid into said pots, each of said injector means having
   an injector nozzle adapted to be connected to said cooking fluid supply source, said nozzle having a head portion extending through said pot drainage opening and being so sized with respect to said pot drainage opening as to provide a pot drainage space therebetween, said nozzle head portion having a nozzle opening therein disposed within the pot, and
   valve means on said nozzle head movable into first and second positions by the respective presence and absence of cooking fluid flow through said nozzle opening, said valve means being operable in said first position to close said pot drainage space and permit cooking fluid from said nozzle opening to enter the pot and being operable in said second position to open said pot drainage space and permit drainage of the cooking fluid from the pot; and
   control means for selectively connecting said injector nozzles of said cooking fluid injector means to said cooking fluid supply source to permit selective utilization of said pots for cooking.

2. Cooking apparatus as claimed in claim 1 wherein said valve means comprises
   a valve member having
      a crown portion covering said nozzle head portion and slidable thereon into first and second positions corresponding to said first and second positions of said valve means, said crown portion having a plurality of peripherally-disposed apertures therein spaced a distance from the closed end thereof, and
      a flange portion surrounding said crown portion and extending outwardly therefrom at a point between the open end of said crown portion and said crown portion apertures, said flange portion being of a size sufficient to close said pot drainage space when said crown portion is in said first position thereof, and
   substantially fluid-tight sealing means disposed between said nozzle head portion and said valve member crown portion, said sealing means being so located on said nozzle head portion as to lie between said valve member crown portion apertures and said valve member flange portion when said valve member is in said first position and to lie between said valve member crown portion apertures and said closed end of said valve member crown portion when said valve member is in said second position.

3. Cooking apparatus as claimed in claim 2 wherein
said pot bottom drainage opening is substantially circular,
said nozzle head portion is substantially cylindrical,
said valve member is a substantially cylindrical hat-shaped member, and
said sealing means is an O-ring seal surrounding said nozzle head portion.

4. Cooking apparatus as claimed in claim 3 wherein said valve means further comprises
annular-shaped sealing means disposed on said valve member flange portion for providing a substantially fluid-tight seal between said flange portion and the bottom of the pot when said valve means is in said first position.

5. Cooking apparatus as claimed in claim 4 wherein each of said pots has an inwardly-extending recessed portion in the bottom thereof surrounding said pot bottom drainage opening, said recessed portion having a plurality of apertures therein of such size as to permit the passage of cooking fluid therethrough but prevent the passage of pastatherethrough.

6. Cooking apparatus as claimed in claim 5 wherein said pot bottom recessed portion comprises a mesh cylinder having one end thereof concentrically disposed with respect to said pot bottom drainage opening and the other end thereof closed by a substantially imperforate cap.

7. Cooking apparatus as claimed in claim 5 wherein said pot bottom recessed portion comprises a substantially dome-shaped member surrounding said pot bottom drainage opening, said dome-shaped member having a plurality of involuted elongated openings in the wall thereof to produce spiral streams of cooking fluid from said nozzle opening and thereby impart a gentle swirling motion to the cooking fluid in the pot for the cooking of delicate pastas.

8. Cooking apparatus as claimed in claim 5 wherein each of said pot support means comprises a substantially cylindrical support member extending through and supported by the bottom of said pot chamber and concentrically disposed with respect to said pot bottom drainage opening, said support member having
a plurality of support arms extending upwardly and outwardly therefrom for engaging the pot bottom, and
a concentrically-disposed bore extending therethrough for receiving and supporting said injector nozzle therein and connecting said nozzle to said cooking fluid supply source.

9. Cooking apparatus as claimed in claim 5 wherein
said pots are cylindrical and have a plurality of openings in the walls thereof which are located below the top of said pot chamber, and
at least one pot spinning means is provided in said pot chamber for rotating said pots about the cylindrical axes thereof to expel the cooking fluid remaining after cooking through said openings in the walls of said pots.

10. Cooking apparatus as claimed in claim 9 wherein oil injection means is provided in said pot spinning means for injecting edible oil into said pots during rotation thereof to coat the pasta and prevent sticking of the pasta.

11. Cooking apparatus as claimed in claim 10 wherein said pot spinning means comprises
a substantially cylindrical bearing member extending through and supported by the bottom of said pot chamber, said bearing member having a substantially concentrically disposed and longitudinally-extending bore therethrough, an upper portion thereof disposed in said pot chamber and a lower portion thereof disposed below said pot chamber bottom, said bearing member upper portion having a plurality of outwardly and upwardly extending support arms thereon which form a pot receiving cage,
a spindle rotatably disposed in said bearing member bore and extending beyond the ends of said bore, said spindle having
a head portion mounted on one end thereof and extending into said pot bottom recessed portion, and
a radially-extending annular flange on said spindle head portion disposed within said cage for engaging the bottom of a pot therein, and
means connected to the other end of said spindle for rotating said spindle within said bearing member bore to thereby spin the pot.

12. Cooking apparatus as claimed in claim 11 wherein said oil injection means comprises
a first plurality of radially-extending bores in said spindle head portion,
a second plurality of radially-extending bores in the portion of said spindle disposed in said bearing member lower portion,
a longitudinally-extending passageway in said spindle communicating with said first and second plurality of bores,
an annular groove surrounding said bearing member bore communicating with said second plurality of bores,
a pair of sealing means surrounding said spindle within said bearing member bore, said pair of sealing means being disposed on opposite sides of said annular groove to prevent leakage therefrom, and
an oil supply source connected to said annular groove for supplying edible oil thereto under pressure.

13. Cooking apparatus as claimed in claim 12 wherein check valve means is provided in said longitudinally-extending passageway in said spindle between said first and second plurality of bores to permit pressurized oil from said oil supply source to enter said first plurality of bores and prevent cooking fluid from the pot from entering said second plurality of bores.

14. Cooking apparatus as claimed in claim 5 further comprising
an enclosed housing having a top cover with a plurality of pot receiving openings therein, said housing being divided into a vent chamber and said pot chamber by a wall separating said chambers, said wall being of a height which does not reach said top cover so that a vent opening is provided between said wall and said top cover, and
exhaust blower means connected to said vent chamber for exhausting the air therefrom, whereby steam and other cooking odors produced in said pot chamber during cooking are drawn out through said vent opening and prevented from escaping through said top cover.

15. Cooking apparatus as claimed in claim 9 wherein each of said cylindrical pots has a downwardly curving rim which is adapted to receive a pot cover thereon, and a pot handle is provided for moving said pots from said pot support means to said pot spinning means, said pot handle having a pair of handle members each having a handle section and a jaw section, said handle members being pivotally joined to each other at a pivot point which separates the handle and jaw sections of each member so that when the handle sections are compressed towards each other the jaw sections are opened, the jaw section of one of said handle members having an arcuately curved portion which substantially matches the curvature of the upper surface of said pot rim, the jaw section of the other of said handle members having a toroidal portion which substantially matches the curvature of the lower surface of said pot rim and a stabilizing portion depending from said toroidal portion for engaging the wall of the pot, and spring means disposed between said handle members for biasing said handle sections apart and said jaw sections together.

* * * * *